May 27, 1958 N. WEINTRAUB 2,836,658

MULTICHANNEL COMMUNICATION SYSTEMS

Filed April 30, 1952 2 Sheets-Sheet 1

INVENTOR
NELSON WEINTRAUB
BY Percy P. Lantzy
ATTORNEY

INVENTOR
NELSON WEINTRAUB
BY Percy P. Lantzy
ATTORNEY

United States Patent Office 2,836,658

Patented May 27, 1958

2,836,658

MULTICHANNEL COMMUNICATION SYSTEMS

Nelson Weintraub, Irvington, N. J., assignor to International Telephone and Telegraph Corporation, a corporation of Maryland Application April 30, 1952, Serial No. 285,143

8 Claims. (Cl. 179—15)

This invention relates to a control arrangement such as in a multichannel communication system and more particularly to a pulse time modulation system employing in the terminal equipment a single delay line for sets of circuits such as both the adjacent multiplex modulator and multiplex demodulator sections.

Heretofore pulse time modulation system terminals employed therein a separate delay device to activate the multiplex modulator to produce the multichannel pulse wave and a separate delay device to activate the multiplex demodulator to aid in the separation of a multichannel pulse wave into separate trains of modulated pulses and reproduce therefrom the modulating signal. Furthermore, in the multiplex demodulator herebefore employed, there is needed a marker separator and pulse generator circuit which amplifies and shapes the incoming pulse wave from the R.-F. receiver, delivers the amplified and reshaped pulse wave to channel demodulator units, separates the marker pulse from the incoming pulse wave, and generates from the marker pulse control pulses, one for alarm and one for each individual channel demodulator. To accomplish these functions, the marker separator and pulse generator circuit includes at least nine electron discharge devices and associated circuitry.

I have discovered that the duplication of delay devices and employment of a complicated marker separator and pulse generator circuit is not necessary in a pulse time modulation system for desired multichannel communication where the multiplex modulator and multiplex demodulator are adjacent, such as in the terminal equipment employed therein. Therefore, it is an object of my invention to provide a simplified pulse communication terminal system; and a further object is to provide terminal equipment which employs the same delay device and multichannel pulse sources for sets of circuits such as both the modulators and demodulators of the terminal.

A feature of this invention is the employment of an oscillator and a pulse generator to produce a base pulse including a normal positive-going pulse for generation of the marker pulse plus a negative-going pulse, delayed a predetermined amount from the "M" pulse to demodulate the channel pulses of the multichannel pulse wave signal received by the R.-F. receiver.

Another feature of this invention is the delay device common to both the adjacent multiplex modulator and multiplex demodulator to produce a series of positive-going and negative-going pulses in a time sequence for application to respective modulator units and demodulator units.

A further feature of this invention is the elimination of the marker separator-pulse generator circuit of systems heretofore proposed and the substitution of a pulse shaper for properly shaping the incoming multichannel pulse wave prior to application to the multiplex demodulator.

The above-mentioned and other features and objects of this invention will become more apparent by reference to the following description taken in conjunction with the accompanying drawings, in which.

Figure 1:
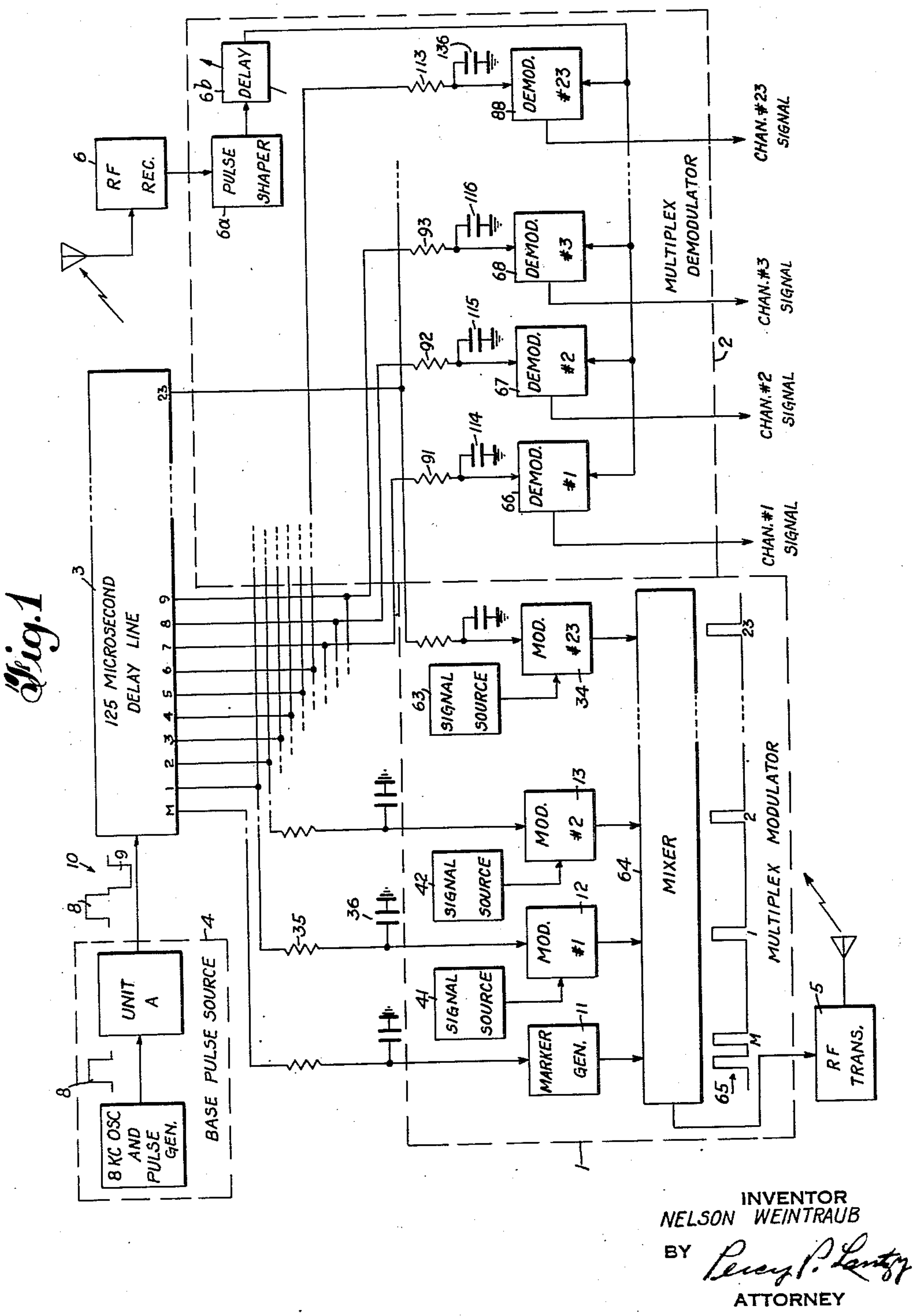
Fig. 1 is a block diagram of an adjacent multiplex modulator and multiplex demodulator employed in a pulse time modulation system following the principles of this invention.

Referring to Fig. 1, an embodiment of the terminal equipment of a pulse time modulation system is shown which incorporates 23 active channels plus one marker pulse channel for communication purposes. The application of this invention is not necessarily restricted to this number of active channels, but will be employed herein for the purpose of explanation.

In accordance with this invention, pulse time modulation terminal equipment, comprising the multiplex modulator 1 and the multiplex demodulator 2 in an adjacent relationship, employs a common delay line 3 and a source 4 of complex base pulses for production of the channel pulses to be modulated in modulator 1 and for separating the different channels into separate trains of modulated pulses for reproduction of the original signals in demodulator 2. The output from modulator 1 is coupled to the R.-F. transmitter 5 for transmission of the multichannel pulse wave in one direction of the radio link, while a similar multichannel pulse wave will be received in R.-F. receiver 6 going in the opposite direction on the radio link.

The complex base pulse source 4 for a 23 active channel system herein illustrated comprises a base frequency oscillator and puse generator 7 and a Unit A for production of the positive "M" pulses and a negative counterpart, as shown by pulses 8 and 9, respectively, herein at an 8 kc. rate. The operation of this source 4 is as follows. Oscillator and pulse generator 7 produce a square wave pulse 8 which is coupled to Unit A, the pulse converter unit, wherein the positive-going pulse is converted to a pulse substantially as indicated by complex base pulse 10 of Fig. 1 and curve A of Fig. 2 to provide the appropriate pulse input to the 125 microsecond delay line 3. Fig. 3 illustrates schematically an embodiment of such a circuit. Pulse 8 is coupled to electron discharge device 137, shown herein to be of the pentode type, but may be any type to achieve the desired result of pulse production herein required, through terminal 138 from generator 7. The anode 139 of device 138 is coupled to a 3.5 microsecond delay line 140 terminated in a short circuit. This shorted termination for delay line 140 effectively produces a reflected pulse 9, 180° out of phase with respect to pulse 8. Thus, the output from anode 139 is substantially as shown in curve A of Fig. 2 but 180° out of phase as shown by pulse 141 in Fig. 3. For proper operation of the overall systems, it is required that the width of "M" pulse or pulse 8 be less than the delay of delay line 140. Therefore, the width of pulse 8 and the delay shown herein is not the only combination available as long as the above-mentioned requirement be maintained. In the embodiment of the pulse converter unit herein illustrated, the actual delay and conversion takes place at one point, at the anode 139. As mentioned above, pulse 141 is 180° out of phase with pulse 10 of Fig. 1. To invert pulse 141, it is necessary to employ electron discharge device 142. As illustrated, device 142 is a pentode type device but may be any type to perform the inversion and maintain a gain of approximately one or less with the associated circuitry illustrated. Thus, with device 142 having a gain of approximately one and device 137 having a gain slightly higher than one, the overall gain of unit A will be approximately one, which when pulsed by pulse 8 of sufficient amplitude, say 120 volts, the pulse 10 to device 3 will not exceed this amplitude. The pulse 10 shown in curve A, the output at terminal 143, indicates the approximate duration of the pulses 8 and 9, and the approximate required delay between the leading edges of these pulses for the system herein being described.

Delay line 3 includes 24 taps for removing activating pulses in a predetermined time relationship, one tap to activate the marker pulse generator 11 of modulator 1 and the other taps to provide successively delayed pulses, similar to pulse 10, for activation of the channel modulator units 12–34. The marker generator 11 may be any suitable device capable of producing a pair of marker pulses, each pulse of the pair being of very short duration and being spaced closely together so as to be distinguished from the channel pulses. Such a marker generator is described in the patent to D. D. Grieg, No. 2,485,591, October 25, 1949, entitled "Multichannel System." The marker generator employed herein and described fully in the above-cited patent may be activated from any pulse source, but preferably from the same source as used for producing the signal modulated channel pulses, such as source 4 herein illustrated. In such a case, the pulse 10 may be coupled to a suitable reflecting delay line contained in generator 11 to produce two positive pulses of very short duration and spaced very closely together. It is important that the time spacing between the two pulses of the marker pair is less than the space between them and any other pulses or between any other pulses in the multichannel pulse wave. This requirement is necessary for readily distinguishing the marker pulses from the individual signal modulated channel pulses contained in the multichannel pulse wave.

Considering tap #1 of delay line 3, pulse **10*a* of curve B is present which is identical to pulse 10 but delayed by 5.2 microseconds. This pulse 10*a* is fed to modulator unit 12, which may be a plug-in type modulator, through the isolation resistor 35 and integrating capacitor 36. The modulator units 12–34** may be any suitable device activated by a pulse source and signal energy from signal sources for production of time modulated channel pulses. Such a modulator unit is shown and described in the previously cited Grieg patent, and further embodiments adaptable to the present invention may be found in the patents to E. Labin, No. 2,445,783, July 27, 1948, entitled "Transmission Systems"; E. Labin-D. D. Grieg, No. 2,429,631, October 28, 1947, entitled "Modulator System"; and E. M. Deloraine-J. L. Fearing, No. 2,429,613, October 28, 1947, entitled "Pulse Multiplex Communication System."

Figure 2:
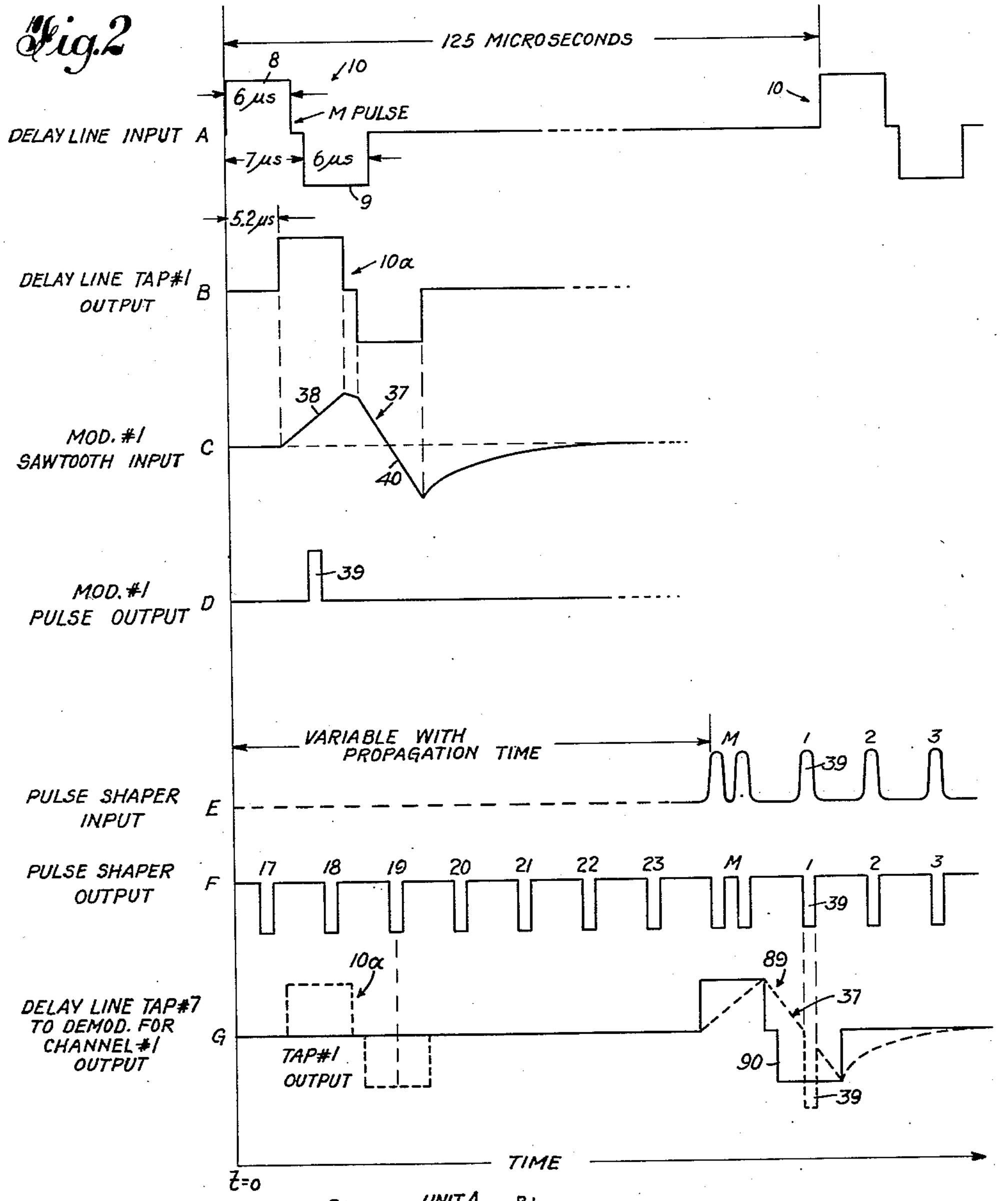
Fig. 2 illustrates graphically the functions of Fig. 1.
Figure 3:
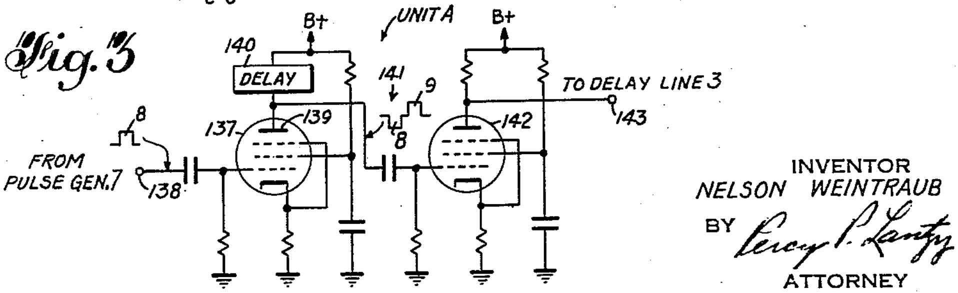
Fig. 3 is a schematic diagram of an embodiment of unit A of Fig. 1.

By reason of the resistor 35 and capacitor 36, the input to modulator unit 12 is sawtooth in shape as shown by pulse 37 in curve C of Fig. 2. The positive-going pulse 38 produces, in the manner described by the above-cited patents, the channel #1 pulse 39, shown in curve D of Fig. 2. The negative-going portion 40 of pulse 38 has no influence on channel #1 modulator unit 12 or any of the other modulator units 13–34 since the PTM modulator units described in the above-cited patents are not responsive to negative impulses. Each of the modulator units 13–34 produces a pulse for its corresponding channel in substantially the same manner as described for the production of channel #1 pulse.

The channel pulse outputs of modulator units 12–34 are modulated by signal energy from the signal sources 41–63 to produce a time displacement of the various channel pulses from their respective quiescent points, the displacements thereof being representative of the modulating signal energies. These time modulated channel pulses are applied to mixer 64 wherein the pulses of the various channels plus the marker pulse are amplified and interleaved in a time relationship established by delay device 3. The mixer 64 may be similar to the mixer employed in the above-cited Patent No. 2,485,591 to D. D. Grieg. The mixer 64 should comprise therein a suitable device for interleaving or combining the trains of pulse from the separate channel modulators 12–34 plus the marker pulse from generator 11, so that the energy in one channel pulse train will not be fed back into the circuit of another. Suitable means for accomplishing this is to provide a parallel arrangement of triodes in which the separate pulse trains are applied to the appropriate grids of the plurality of triodes and the plate circuits thereof are combined. The resulting output from mixer 64, shown in pulse train 65 of Fig. 1 wherein the channel pulses are in their quiescent positions, is coupled to the R.-F. transmitter 5 for translation of the PTM pulse trains into R.-F. energy for transmission over the radio link.

Receiver 6 located in the same equipment as transmitter 5 receives a multichannel pulse wave, similar to the multichannel pulse wave transmitted, from either a repeater station or another terminal, as the case may be. The receiver 6 output, as seen in curve E of Fig. 2, is coupled to the pulse shaper **6*a*. This pulse train will be variable in time with respect to the pulse driving the 125 microsecond delay line 3, being dependent upon the propagation time of the multi-channel pulse wave received at receiver 6. An adjustable delay device 6*b* is provided following shaper 6*a* to provide an adjustment for the position of the pulse to correct the pulse position for application of the pulses to the demodulator units 66–88**, where the propagation time may be such to position the pulses improperly for demodulation.

Shaper **6*a* comprises three electron discharge devices and associated circuitry to shape the output of the receiver 6 for application to the demodulator units 66–88, replacing nine stages of the marker separator-pulse generator circuits herebefore employed. The output of shaper 6*a***, for an arbitrary case where the channel #1 pulse falls approximately 6×5.2 microseconds later than the "M" pulse, is shown in curve F of Fig. 2.

With the arbitrary case shown herein, in order to demodulate channel #1, it is necessary to apply the output from tap #7 of the delay device 3 and feed this pulse 89, similar to pulse **10*a*, having a time position equal to 6×5.2 microseconds later than that of pulse 10*a*, to demodulator unit 66 which may be of the plug-in type. The pulse 89 is shown in curve G of Fig. 2 compared in time to pulse 10*a* and in position to the channel #1 pulse of curve F. Each of the demodulator units 66–88 receives a low impedance pulse train from delay unit 6*b*. Thus with the aid of the negative portion 90 of tap #7 output, pulse 89, the channel #1 may be separated and demodulated to reproduce the modulating signal contained in the channel #1 pulse train. Channels 2–23 are demodulated in a similar manner by pulses from successive taps of delay line 3, for example as shown in curves F and G the tap #1 output will demodulate channel #19. The tap connected to the channel demodulators depends upon the propagation time of the received signal with respect to the marker pulse. If the propagation time of the received signal is greater than the arbitrary case selected, then the tap connected to channel #1 demodulator will be advanced to maybe tap #9 or 10, depending upon the propagation time. If the propagation time is less than the arbitrary case selected, then the tap connected to channel #1 demodulator may be tap #5 or 6, depending upon the propagation time. In either case the succeeding channel demodulators will be connected to the succeeding delay taps of device 3** to properly effect the separation and demodulation of the channel pulse trains contained in the multichannel pulse wave.

The demodulator units 66–88 employed herein may be any device capable of separating the multichannel pulse wave into channel pulse trains and performing a demodulation action thereon to reproduce the modulating signal present in each of the channels. Such a device is described in the above-cited D. D. Grieg Patent No. 2,485,591, and a further embodiment adaptable to this present invention may be found by referring to the above-cited E. M. Deloraine and J. L. Fearing Patent No. 2,429,613.

The delay line 3 inputs to demodulator units 66–88 are isolated therefrom by resistors 91–113 so that no effect is felt on the modulator 1 side of the delay device 3. Small timing errors, less than one-half of 5.2 microseconds, which may occur due to the propagation time of the multichannel pulse wave input to receiver 6, are taken care of by partially integrating the pulses from the delay line 3 to the various demodulator units 66–88 with the aid of condensers 114–136 and the resistors 91–113 and also by proper manipulation of the delay device *6b*. The resulting input to demodulator units 66–88 is substantially as shown by pulse 37 of curve C of Fig. 2. Although the positive portion 38 of the pulse will operate certain portions of the demodulator units 66–88, no harmful effect results in the reproduction of the channels' audio intelligence since the effect of the positive portion of pulse 37 is removed by clipping at a predetermined level prior to the extraction of the audio intelligence. Separation and demodulation of the plurality of channels are effected by the negative part of the pulse from the delay line 3, and the demodulator units 66–88 are effectively insensitive to positive impulses as described in the above-cited patents relating to demodulators.

Hence, equipment in a pulse time modulation system wherein the multiplex modulator 1 and the multiplex demodulator 2 are adjacent may be simplified for a system employing therein any desired number of channels. To achieve modulation and demodulation of communication systems following the principles of this invention, there is required the addition of unit A to provide a conversion of the usual base pulse to a complex base pulse having a positive pulse portion and a negative pulse portion delayed therefrom a given amount for employment primarily in the demodulation process, said unit A may comprise a simple delay device to achieve the proper delay and an electron discharge device to achieve the proper converting operation. By introducing this increase of electron discharge devices and associated circuitry, it is possible to eliminate one of the two delay lines presently being employed in PTM systems and a major portion of the presently employed marker separator-pulse generator circuit. Therefore, the employment of this invention results in a saving of equipment and space necessary to mount the equipment. Not only is a saving accomplished by employment of this invention, but the process of demodulating the incoming multichannel pulse wave is altered somewhat and made simpler than the process and circuitry involved in the present demodulation systems.

While I have described above the principles of my invention in connection with specific apparatus, it will be clear to those skilled in the art that instead of pulse time modulation, other forms of modulation such as pulse amplitude, pulse width, or pulse code may be employed without departing from the invention. Therefore, it is to be clearly understood that this description is made only by way of example and not as a limitation to the scope of my invention as set forth in the objects thereof and in the accompanying claims.

I claim:

1. In a multichannel pulse communication system, a source of gate pulses recurrent at a given repetition frequency having a portion of one polarity and another portion of the opposite polarity, a delay line coupled to said source, said delay line having a plurality of output connections for different delay timing, a plurality of channel pulse modulators, a signal source for each of said modulators, means coupling said modulators to each of said output connections for interleaving the channel pulses of said modulators in a time relation according to the gate pulse portion of said one polarity for transmission as a train of channel pulses, a plurality of demodulators for a received train of channel pulses, and means coupling said demodulators to each of said output connections for effecting separation and demodulation of the channel pulses of said received train according to the time relation of the gate pulse portion of said opposite polarity.

2. In a communication system according to claim 1, wherein said gate pulse source comprises a base repetition frequency oscillator, a pulse generator, and a pulse converter for converting pulses received from said pulse generator to gate pulses each having a pulse portion of one polarity and another pulse portion of the opposite polarity, one pulse portion being delayed with respect to the other pulse portion.

3. In a communication system according to claim 1, wherein said means coupling said modulators to said output connections comprises a resistor connected to each of said output connections, a condenser coupled in series between each of said resistors and a reference potential and a conductor means connected between the junction of said resistor and condenser and said modulators, said resistor and said condenser providing isolation of said modulators from said demodulators and integration of the pulses applied from the said delay device to said modulators.

4. In a communication system according to claim 1, wherein said means coupling said demodulators to said output connections comprises a resistor connected to each of said output connections, a condenser coupled in series between each of said resistors and a reference potential and a conductor means connecting between the junction of said resistor and condenser and said demodulators, said resistor and said condenser providing isolation of said demodulators from said modulators and integration of the pulses applied from said delay device to said demodulators, said demodulators being coupled sequentially to given ones of said output connections depending upon the propagation time of said received train and the pulse timing of said output connections.

5. In a multichannel pulse communication system, a source of complex gate pulses recurrent at a given repetition frequency each having a second pulse portion delayed with respect to a first pulse portion, a delay line coupled to said source, said delay line having a plurality of output connections for different delay timing of said complex gate pulses, a plurality of channel pulse modulators, a signal source for each of said modulators, means coupling said modulators in sequence to each of said output connections for interleaving the channel pulses of said modulators in a time relation according to the first pulse portion of said complex gate pulses for transmission as a train of channel pulses, a plurality of channel pulse separators for a received train of channel pulses, and means coupling said separators in sequence to each of said output connections for effecting separation of the channel pulses of said received train in accordance with the time relation of the second pulse portion of said complex gate pulses, the sequential connection of said demodulators starting at an output connection spaced a given number of said output connections from the start of the sequential connection of said modulators.

6. In a communication system according to claim 5, wherein said complex gate pulse source comprises a base repetition frequency oscillator, a pulse generator, and a pulse converter for converting pulses received from said pulse generator to said complex gate pulses, the first portion thereof having a positive polarity and the second portion thereof having a negative polarity.

7. In a communication system according to claim 5, wherein said means coupling said modulator to said output connections comprises a resistor connected to each of said output connections, a condenser coupled in series between each of said resistors and a reference potential and a conductor means connected between the junction of said resistor and condenser and said modulators, said resistor and said condenser providing isolation of said modulators from said separators and integration of the pulses applied from said delay device to said modulators.

8. In a communication system according to claim 5, wherein said means coupling said separators with said output connections comprises a resistor connected to each of said output connections, a condenser coupled in series between each of said resistors and a reference potential and a conductor means connected between the junction of said resistor and condenser and said separators, said resistor and said condenser providing isolation of said separators from said modulators and integration of the pulses applied from said delay device to said separators, said separators being coupled sequentially to given ones of said output connections depending upon the propagation time of said received train and the pulse timing of said output connections.

References Cited in the file of this patent

UNITED STATES PATENTS

| | | |
|---|---|---|
| 2,471,416 | Deloraine et al. | May 31, 1949 |
| 2,527,558 | Levy | Oct. 31, 1950 |
| 2,541,076 | Labin et al. | Feb. 13, 1951 |
| 2,557,950 | Deloraine | June 26, 1951 |
| 2,570,010 | Staal | Oct. 2, 1951 |